United States Patent [19]
Lebby et al.

[11] Patent Number: 5,367,593
[45] Date of Patent: Nov. 22, 1994

| [54] | OPTICAL/ELECTRICAL CONNECTOR AND METHOD OF FABRICATION |
|---|---|
| [75] | Inventors: Michael S. Lebby, Apache Junction; Christopher K. Y. Chun, Mesa; Shun-Meen Kuo, Chandler; Davis H. Hartman, Phoenix, all of Ariz. |
| [73] | Assignee: Motorola, Inc., Schaumburg, Ill. |
| [21] | Appl. No.: 115,834 |
| [22] | Filed: Sep. 3, 1993 |
| [51] | Int. Cl.⁵ .......................... G02B 6/12; G02B 6/26; B29D 11/00 |
| [52] | U.S. Cl. ........................................ 385/53; 385/14; 385/49; 385/82; 385/83; 385/89; 385/132; 264/1.1; 264/1.25; 437/209 |
| [58] | Field of Search ................. 385/14, 49, 53, 59, 385/65, 64, 71, 82, 83, 88, 89, 132; 264/1.1, 1.3, 1.4, 1.5, 1.6, 1.7; 437/577, 55, 65, 68, 120, 216, 884, 885, 891, 892, 894; 250/227.11 |

[56]  References Cited

U.S. PATENT DOCUMENTS

| 4,597,631 | 7/1986 | Flores ............................. 385/59 X |
| 5,061,029 | 10/1991 | Ishikawa ......................... 385/14 X |
| 5,071,223 | 12/1991 | Gotoh et al. ...................... 385/14 |
| 5,076,654 | 12/1991 | Presby ............................... 385/129 |
| 5,123,066 | 6/1992 | Acarlar ............................. 385/14 |
| 5,134,681 | 7/1992 | Ratovelomanana et al. ... 385/129 X |
| 5,218,663 | 6/1993 | Isono et al. ....................... 385/129 |
| 5,230,030 | 7/1993 | Hartman et al. ................. 385/88 X |
| 5,235,663 | 10/1993 | Thomas ............................ 385/130 |
| 5,265,184 | 11/1993 | Lebby et al. ..................... 385/132 |

*Primary Examiner*—Brian Healy
*Attorney, Agent, or Firm*—Eugene A. Parsons

[57]  ABSTRACT

An optical/electrical connector including a molded base having a well and a plurality of grooves extending from the well to a first outer edge of the base and alignment guides associated with the grooves at the first outer edge. The base further having external electrical connections with first ends exposed and positioned in the well and second ends extending outwardly beyond a second outer edge of the base. An array of photonic components is positioned in the well and each aligned with a separate groove. The array is electrically coupled to the exposed first ends of the external electrical connections of the base. The grooves are filled with a plastic material to form optical waveguides from the optical ports to the first outer edge.

18 Claims, 5 Drawing Sheets

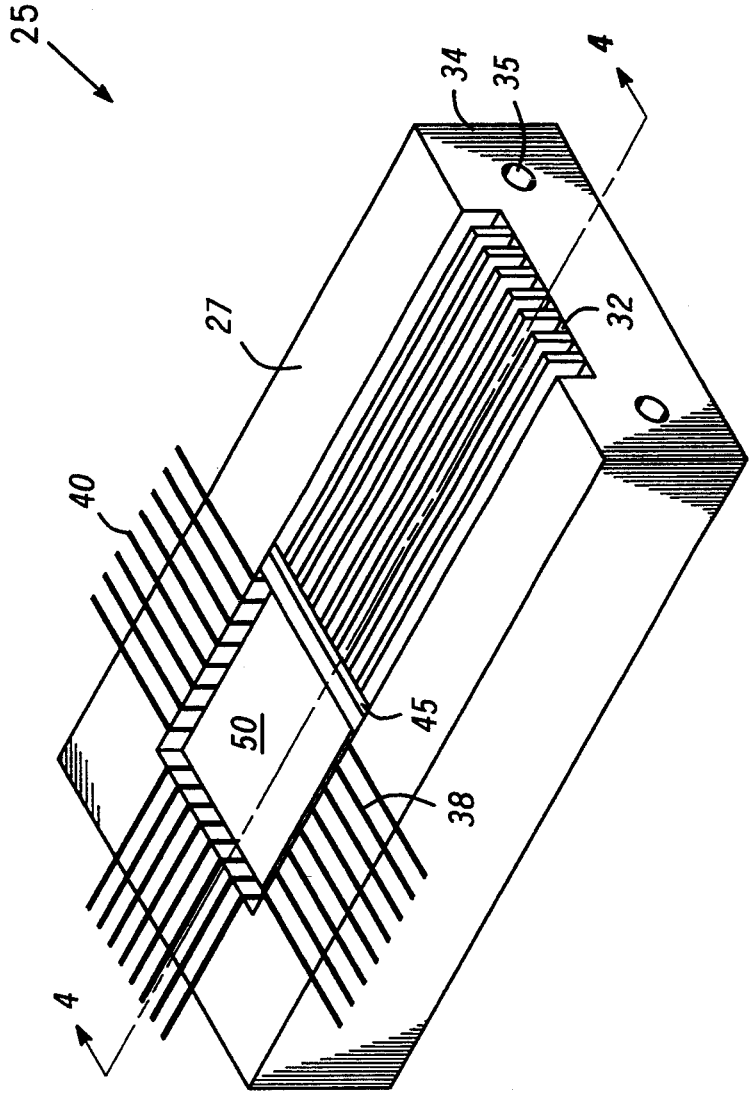

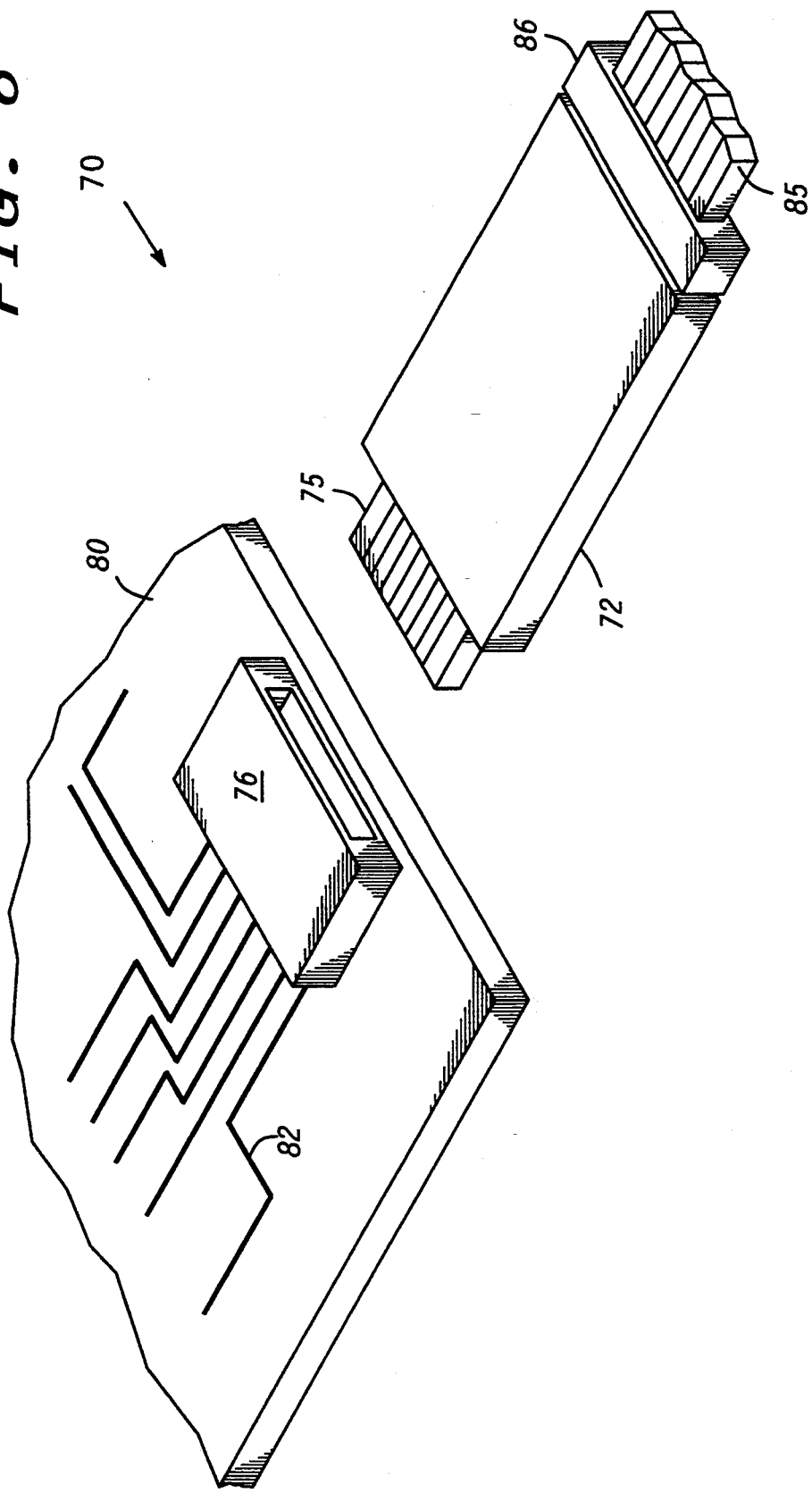

OPTICAL/ELECTRICAL CONNECTOR AND METHOD OF FABRICATION

The present invention pertains to electronic packages with optical and electrical connections and more specifically to packages including optical connections to electronic circuitry and methods of producing the same.

BACKGROUND OF THE INVENTION

Optical couplers between portions of electronic circuits or between components in a system, such as the components in a computer, are very desirable because of the bandwidth of optical fibers and the number of signals that can be communicated through optical fibers. One major problem in using optical fibers between printed circuit boards and the like is the connect/disconnect function. It is essential that various components of the system be removable and/or possible to disconnect so that normal maintenance, as well as changes and updates to the system, can be accomplished. Further, in many instances it is desirable to couple optical signals directly to and from IC chips and the like. Thus, a plug that offers both electrical and optical connect/disconnect functions is highly desirable.

Accordingly, it is a purpose of the present invention to provide a new and improved optical/electrical connector.

It is a further purpose of the present invention to provide a new and improved optical/electrical connector which couples optical signals directly with IC chips, hybrid circuits, printed circuit boards, etc.

It is another purpose of the present invention to provide a new and improved method of fabricating optical/electrical connectors.

It is a still further purpose of the present invention to provide a new and improved method of fabricating optical/electrical connectors that couple optical signals directly with IC chips, printed circuit boards, etc.

SUMMARY OF THE INVENTION

The above problems and others are at least partially solved and the above purposes and others are realized in a method of fabricating an optical/electrical connector including the steps of molding a base with a well and a plurality of grooves extending from the well to a first outer edge of the base. The base is further molded with alignment guides associated with the grooves at the first outer edge and with external electrical connections positioned in the well and extending outwardly beyond the base. An array of photonic components, each having an optical port, is positioned in the well of the base with the optical ports each aligned with a separate groove and electrical terminals of the array are coupled to the external electrical connections of the base. The plurality of grooves in the base are filled with curable plastic material and cured to form optical waveguides from the optical I.O ports of the array to the first outer edge of the base.

In other embodiments of the optical/electrical connector the electrical connections include molding the base with one of the male and female portions of an electrical plug in the base, molding the base with externally situated bump bonds, and molding the base with a leadframe therein. In one latter embodiment, the leadframe is formed to extend outwardly from three edges, other than the first edge, to form a quad-flat-pack.

BRIEF DESCRIPTION OF THE DRAWINGS

Referring to the drawings:

FIG. 3 is a perspective view similar to the view of FIG. 2, in another intermediate step of fabrication;

FIG. 6 is a perspective view of another embodiment of an optical/electrical connector embodying the present invention.

DESCRIPTION OF THE PREFERRED EMBODIMENT

Figure 1:
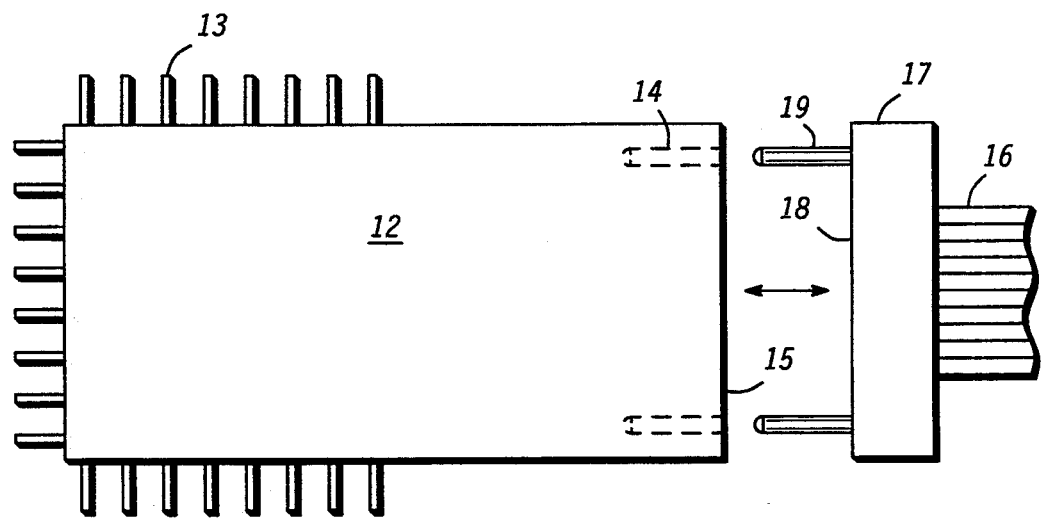
FIG. 1 is a view in top plan of an optical/electrical connector embodying the present invention.

Referring specifically to FIG. 1, a view in top plan of an optical/electrical connector 10 embodying the present invention is illustrated. Connector 10 includes a base 12 with a plurality of leads 13 extending outwardly from three edges thereof. Alignment guides, which in this specific embodiment are holes 14, are formed in a fourth edge 15 of base 12. As will be explained presently, in a preferred embodiment base 12 is molded, with leads 13 and holes 14 positioned and/or formed therein during the molding process. Further, one end of a plurality, or bundle, of optical fibers 16, such as a fiber ribbon, is molded into a package 17 so that one end of each of the plurality of optical fibers 16 is exposed in a surface 18 of the package. Alignment guides, such as ferrules 19, are also molded into package 17 so as to extend outwardly from surface 18. When ferrules 19 are matingly engaged in holes 14, surface 18 is in abutting engagement with edge 15.

Figure 2:
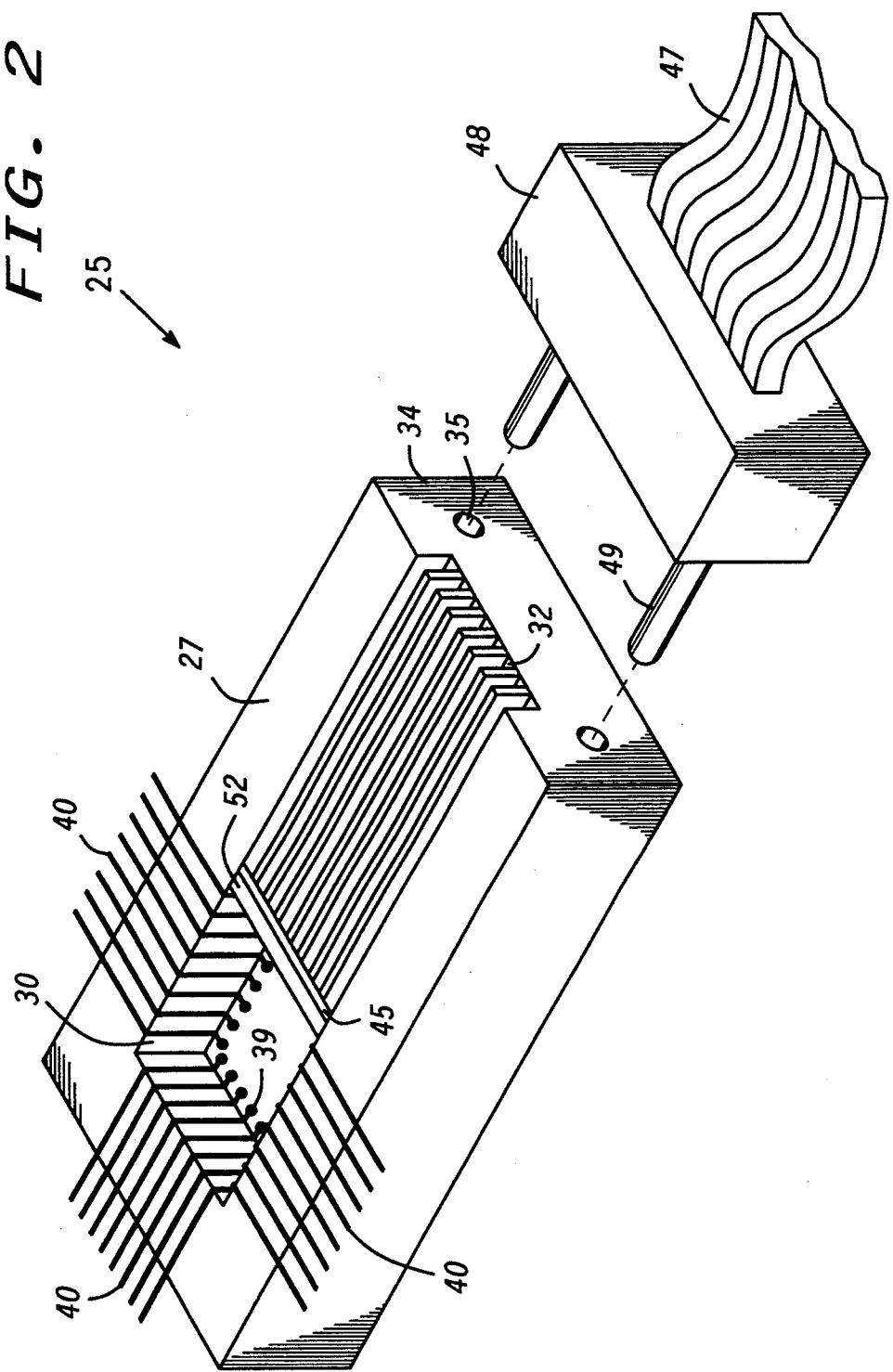
FIG. 2 is a perspective view of an optical/electrical connector similar to the connector of FIG. 1, in an intermediate step of fabrication.

Referring to FIG. 2, an optical/electrical connector 25, similar to connector 10, of FIG. 1 is illustrated in a perspective view. Connector 25 is illustrated in an intermediate step of the fabrication process. A generally rectangularly shaped base 27, which has been formed by molding, includes a well 30 and a plurality of grooves 32 formed in one major surface. Grooves 32 extend from one side of well 30 to a first outer edge 34 of base 27 and are generally rectangular in cross-section. Also, alignment guides, which in this specific embodiment are holes 35 are formed in edge 34 of base 27. External electrical connections, in this embodiment a preformed leadframe 38, having first ends, or terminals, 39 exposed and positioned in well 30 and second ends 40 extending outwardly beyond the other three outer edges of base 27 is included in base 27 at the time of molding. It will of course be understood that in some special applications it may be convenient to mold base 27 with well 30 and grooves 32 and then simply insert preformed leadframe 38 into well 30 after the molding is completed.

An array 45 of photonic components, each having an optical port, is positioned in well 30 with the optical ports each aligned with a separate one of the plurality of grooves 32. Array 45 further has electrical terminals associated therewith and directly coupled to leadframe 38. In most instances, leadframe 38 and array 45 are designed so that the electrical terminals associated with array 45 are in contact with appropriate exposed portions of leadframe 38 when the array is properly positioned in well 30. It will of course be understood that the photonics components of array 45 could be connected to leadframe 38 by any of the well known means, such as wire bonding, bump bonding, etc. As will be understood by those skilled in the art, the photonics components of array 45 may include lasers, vertical cavity surface emitting lasers, light emitting diodes, photo detectors, photosensitive diodes, etc. or any combination thereof.

A plurality of optical fibers 47 are also illustrated in FIG. 2 with one of the ends thereof molded into a package 48, as explained above in conjunction with FIG. 1. Alignment guides, ferrules 49, are also included for engagement with holes 35. With ferrules 49 engaged in holes 35 so that the surface of package 48 abuts edge 34, the exposed ends of optical fibers 47 are aligned, one each, with grooves 32 in base 27. Further, as already explained, photonics components of array 45 have an optical port, one each, aligned with individual grooves 32 at the other end thereof.

A perspective view of optical/electrical connector 25 is illustrated in FIG. 3, in another intermediate step of the fabrication process. In this step an IC chip 50 is illustrated in position in well 30. Here it will be understood that IC chip 50 could in fact be a small printed circuit board or hybrid circuit having one to several IC chips mounted thereon and it is intended to cover all such modifications in the term IC chip. Terminals 39 (see FIG. 2) are positioned so that the various bonding pads of IC chip 50 each engage an appropriate terminal 39 when IC chip 50 is positioned in well 30. Permanent connections are made by, for example, placing a solder bump on each terminal 39 to be connected, placing IC chip 50 into well 30 and applying conductive heat, infra red heat, etc. to melt the solder bump and form a permanent connection. With IC chip 50 and array 45 properly connected to leadframe 38, grooves 32 are filled with a curable plastic material having an appropriate index of refraction (when cured) to form optical waveguides.

Figure 4:
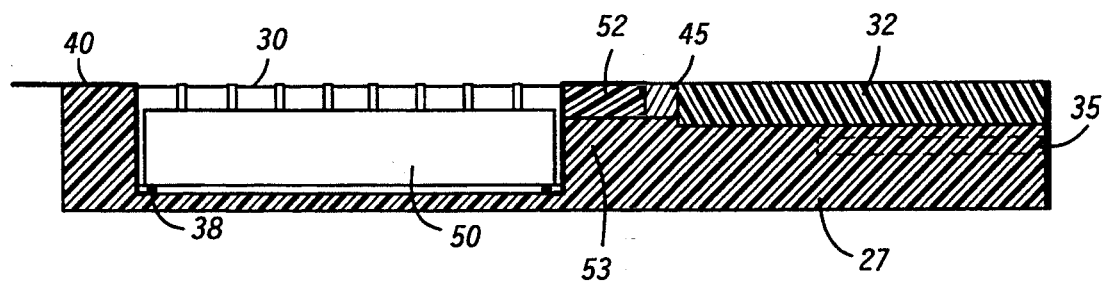
FIG. 4 is a sectional view as seen from the line 4—4 of FIG. 3.

As illustrated in FIG. 4, array 45 is mounted on a header 52, which is in turn supported on an alignment step 53 in well 30 so that the optical ports of photonic components in array 45 are aligned with grooves (now optical waveguides) 32. It should be understood that well 30 and the area surrounding array 45 can also be filled with the curable plastic that is used to fill grooves 32, if desired. Also, as explained in the above cited copending patent application, a second generally rectangular base portion or cover (not shown) can be formed and positioned over the upper surface of base 27 to form an upper protective surface for well 30 and grooves 32.

By way of example only, base 27 and the cover are made by injecting a transparent epoxy molding compound, available under the Tradename HYSOL MG18 from Dexter Corporation, into molds. The temperature of the molds ranges between 150° C. to 175° C. with a preferred temperature range from 160 degrees Celsius to 165 degrees Celsius. Molding pressure of the molds ranges between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C. Upon completion of the curing time, base 27 and the cover are removed from the molds. Typically, a post-curing step is necessary in order to achieve maximum physical and electrical properties of the HYSOL material. This step generally proceeds at 150 degrees Celsius for approximately 2 to 4 hours. Completion of the post-cure step results in base 27 and the cover having a refractive index of approximately 1.52.

Once the molding and curing processes, as well as the removal of base 27 and the cover from their respective molds have been completed, base 27 and the coverand are ready to be assembled. Assembly is achieved by applying an optically clear adhesive with a refractive index at least 0.01 higher than base 27 and the cover to grooves 32 and the upper surface of base 27. At this point, well 30 can also be filled. In a preferred embodiment of the present invention, these requirements are fulfilled by applying an optically clear epoxy available under a Tradename EPO-TEK 301-2 from EPOXY TECHNOLOGY INC. Typically, after the adhesive is applied to grooves 32 and the upper surface of base 27, the cover is compressed against the upper surface of base 27, thereby squeezing and filling grooves 32 and adhering both base 27 and the cover together. Curing times for the adhesive epoxy is dependent upon temperature, e.g., at room temperature curing time is 2 days and at 80 degrees Celsius curing time is 1.5 hours.

A more complete explanation of this procedure and the materials utilized is disclosed in a copending U.S. patent application entitled "Molded Waveguide and Method For Making Same", with Ser. No. 07/889,335, now U.S. Pat. No. 5,265,184, filed 28 May 1992, assigned to the same assignee and incorporated herein by reference.

Figure 5:
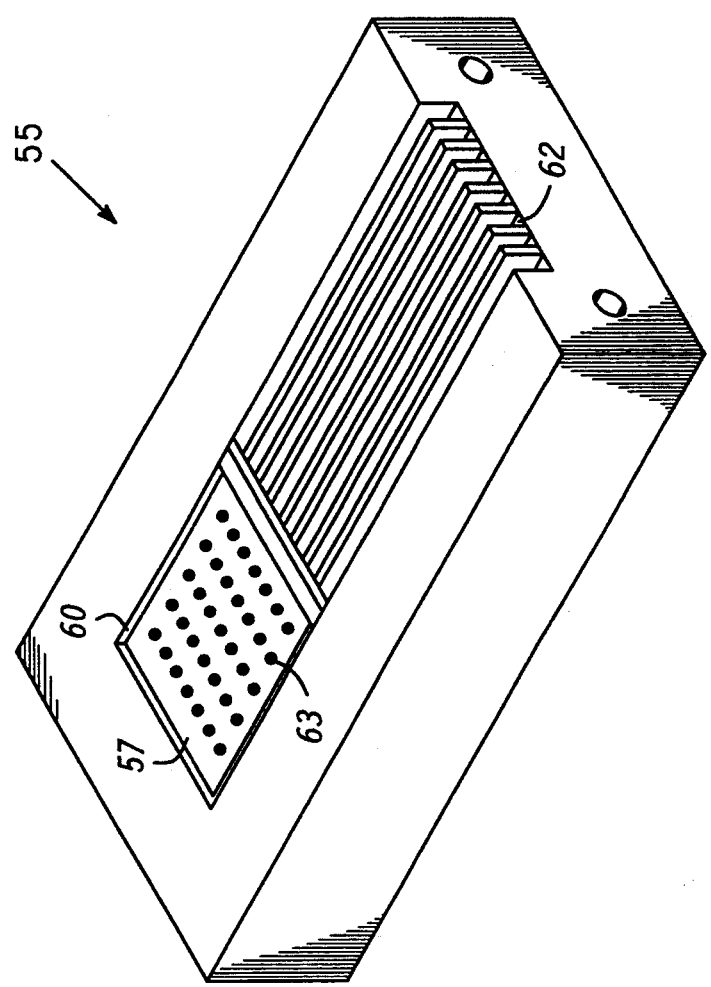
FIG. 5 is a perspective view of another embodiment of an optical/electrical connector embodying the present invention.

In a somewhat different arrangement, IC chip 30 can be placed in well 30 (in an inverted position) with solder bumps or the like on appropriate bonding pads and preformed leadframe 38 can then be placed in well 30 and attached to IC chip 50 by usual methods. In the latter arrangement leadframe 38 can even be attached to IC chip 50 before they are placed in well 30. Further, in some special applications array 45 can be connected directly to IC chip 50, or the photonic components can even be formed directly on IC chip 50. An optical/electrical connector 55, illustrated in FIG. 5, is another different arrangement wherein an IC chip 57 is inverted and positioned in a well 60 with bump bonds 62 formed on the rear surface thereof. In this embodiment, a photonic component array can be mounted directly on IC chip 57 before placing it in well 60. The optical ports of the array are automatically aligned with a plurality of grooves 62 when IC chip 57 is positioned in well 60. IC chip 57 is then molded into well 60 at the same time that grooves 62 are filled with curable plastic and cured.

Another version of an optical/electrical connector, designated 70, is illustrated in FIG. 6. In this embodiment, a base 72 is molded with the well, grooves and alignment guides as explained above. Connector 70 further has external electrical connections molded therein including one of a male or female portion of an electrical plug, in the present case male portion 75. A mating female portion 76 is fixedly mounted on a printed circuit board 80 with electrical leads 82 extending through printed circuit board 80 to remotely located components, not shown. Portions 75 and 76 of the electrical plug are, preferably, any of the zero insertion force connectors presently available on the market. Base 72 and the components contained therein are completely enclosed (explained above) so as to form a unique and very convenient optical/electrical connector. One end of each of a plurality of optical fibers 85 are molded into a package 85 (explained above) and alignment guides are also molded into the package so that it mates with base 72, as illustrated to couple optical fibers 85 directly to electrical leads 82.

Thus, optical/electrical connector 70 is constructed to provide a very convenient means of connecting/disconnecting optical fibers to a printed circuit board or the like. Further, optical fibers 85 and package 86 can be easily disconnected from base 72 so that modified and/or updated components, or components with different functions can be quickly and easily inserted into the circuit. Further, base 72 can include IC chips that provide intelligent feedback for functions such as forward error correction of digital data, as well as or in addition to circuits for indicating errors or failures.

Thus, a new and improved optical/electrical connector is disclosed. The novel optical/electrical connector couples optical signals directly with IC chips, hybrid circuits, printed circuit boards, etc. Further, a new and improved method of fabricating novel optical/electrical molded packages is disclosed. The optical/electrical connectors that couple optical signals directly with IC chips, printed circuit boards, etc. are extremely easy to fabricate and to use and can conveniently be updated or modified when and if desired.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A method of fabricating an optical/electrical connector comprising the steps of:
    molding a base with a well and a plurality of grooves extending from the well to a first outer edge of the base, the base further being molded with alignment guides associated with the grooves at the first outer edge;
    providing an array of photonic components, each having an optical port, and positioning the array in the well of the base with the optical ports each aligned with a separate groove, the array further having electrical terminals associated therewith;
    molding external electrical connections into the base with exposed ends extending outwardly beyond the base;
    coupling the electrical terminals of the array to the external electrical connections of the base;
    filling at least the plurality of grooves in the base with curable plastic material; and
    curing the plastic material in the grooves to form optical waveguides from the optical ports of the array to the first outer edge of the base.

2. A method of fabricating an optical/electrical connector comprising the steps of:
    molding a base with a well and a plurality of grooves extending from the well to a first outer edge of the base, the base further being molded with alignment guides associated with the grooves at the first outer edge, and the base further being molded with external electrical connections having first ends exposed and positioned in the well and second ends extending outwardly beyond a second outer edge of the base;
    providing an array of photonic components, each having an optical port, and positioning the array in the well of the base with the optical ports each aligned with a separate groove, the array further having electrical terminals associated therewith;
    coupling the electrical terminals of the array to the exposed first ends of the external electrical connections of the base;
    filling at least the plurality of grooves in the base with curable plastic material; and
    curing the plastic material in the grooves to form optical waveguides from the optical ports of the array to the first outer edge of the base.

3. A method of fabricating an optical/electrical connector as claimed in claim 2 wherein the step of molding a base with external electrical connections includes molding the base with one of the male and female portions of an electrical plug in the base.

4. A method of fabricating an optical/electrical connector as claimed in claim 2 wherein the step of molding a base with external electrical connections includes molding the base with externally situated bump bonds.

5. A method of fabricating an optical/electrical connector as claimed in claim 2 wherein the step of molding a base with external electrical connections includes the step of molding the base with a leadframe therein.

6. A method of fabricating an optical/electrical connector as claimed in claim 5 wherein the step of molding the base with a leadframe includes molding a leadframe in the base with first ends exposed and positioned in the well and second ends extending outwardly beyond second, third and fourth outer edges of the base to form a quad-flat-pack.

7. A method of fabricating an optical/electrical connector as claimed in claim 6 wherein the step of coupling the electrical terminals of the array to the exposed first ends of the external electrical connections of the base includes the steps of providing a semiconductor chip having a first plurality of electrical I/O terminals and a second plurality of electrical I/O terminals, positioning the chip in the chip receiving well, and connecting the first plurality of electrical I/O terminals to the exposed first ends of the leadframe and the second plurality of electrical I/O terminals to the electrical terminals associated with the array.

8. A method of fabricating an optical/electrical connector as claimed in claim 2 including in addition the steps of providing a plurality of optical fibers each having a first end, molding the plurality of optical fibers into a package with a side formed to removably mate with the first outer edge of the base, and further molding the package with alignment guides designed to mate with the alignment guides associated with the grooves at the first outer edge so as to axially align the plurality of optical fibers, one each, with the plurality of grooves in the base.

9. A method of fabricating an optical/electrical connector comprising the steps of:
    molding a base with a well and a plurality of grooves extending from the well to a first outer edge of the base, the base further including alignment guides associated with the grooves at the outer edge, the base further being molded with a leadframe in the base with first ends of the leadframe exposed and positioned in the chip receiving well and second ends of the leadframe extending outwardly beyond a second outer edge of the base;

providing an array of photonic components, each having an optical port, and positioning the array in the chip receiving well of the base with the optical ports each aligned with a separate groove, the array further having electrical terminals associated therewith;

providing a semiconductor chip having a first plurality of electrical I/O terminal, and a second plurality of electrical I/O terminals, positioning the chip in the chip receiving well, and connecting the first plurality of electrical I/O terminals to the exposed first ends of the leadframe and the second plurality of electrical I/O terminals to the electrical terminals associated with the array;

filling at least the plurality of grooves in the base with curable plastic material;

curing the plastic material in the grooves to form optical waveguides from the optical ports of the array to the first outer edge of the base;

providing a plurality of optical fibers each having a first end; and molding the plurality of optical fibers into a package with a side formed to removably mate with the first outer edge of the base, and further molding the package with alignment guides designed to mate with the alignment guides associated with the grooves at the first outer edge so as to axially align the plurality of optical fibers, one each, with the plurality of grooves in the base.

10. An optical/electrical connector comprising:
a molded base having a well and a plurality of grooves extending from the well to a first outer edge of the base, the base further having alignment guides associated with the grooves at the first outer edge;
the base further having external electrical connections extending outwardly beyond the base;
an array of photonic components, each having an optical port, positioned in the well of the base with the optical ports each aligned with a separate groove, the array further having electrical terminals associated therewith and coupled to the external electrical connections of the base; and
the plurality of grooves in the base being filled with a plastic material to form optical waveguides from the optical ports of the array to the first outer edge of the base.

11. An optical/electrical connector comprising:
a base having a well and a plurality of grooves extending from the well to a first outer edge of the base, the base further having alignment guides associated with the grooves at the first outer edge, and the base further having external electrical connections with first ends exposed and positioned in the well and second ends extending outwardly beyond a second outer edge of the base;
an array of photonic components, each having an optical port, positioned in the well of the base with the optical ports each aligned with a separate groove, the array further having electrical terminals associated therewith and coupled to the exposed first ends of the external electrical connections of the base; and
the plurality of grooves in the base being filled with a plastic material to form optical waveguides from the optical ports of the array to the first outer edge of the base.

12. An optical/electrical connector as claimed in claim 11 wherein the external electrical connections include one of a male and a female portion of an electrical plug molded in the base.

13. An optical/electrical connector as claimed in claim 11 wherein the external electrical connections include externally situated bump bonds.

14. An optical/electrical connector as claimed in claim 11 wherein the external electrical connections include a leadframe molded in the base.

15. An optical/electrical connector as claimed in claim 14 wherein the leadframe includes a leadframe molded in the base with first ends exposed and positioned in the well and second ends extending outwardly beyond second, third and fourth outer edges of the base to form a quad-flat-pack.

16. An optical/electrical connector as claimed in claim 11 including in addition a semiconductor chip having a first plurality of electrical I/O terminals and a second plurality of electrical I/O terminals, the chip being positioned in the well and connecting the first plurality of electrical I/O terminals to the exposed first ends of the leadframe and the second plurality of electrical I/O terminals to the electrical terminals associated with the array.

17. An optical/electrical connector as claimed in claim 11 including in addition a plurality of optical fibers each having a first end, molded into a package with a side formed to removably mate with the first outer edge of the base, and the package further including alignment guides designed to mate with the alignment guides associated with the grooves at the first outer edge so as to axially align the plurality of optical fibers, one each, with the plurality of grooves in the base.

18. An optical/electrical connector comprising:
a molded base having a well and a plurality of grooves extending from the well to a first outer edge of the base, the base further having alignment guides associated with the grooves at the first outer edge, and the base further having one of a male and a female portion of an electrical plug molded in the base with first ends exposed and positioned in the well and second ends extending outwardly beyond a second outer edge of the base;
an array of photonic components, each having an optical port, positioned in the well of the base with the optical ports each aligned with a separate groove, the array further having electrical terminals associated therewith and coupled to the exposed first ends of the portion of an electrical plug;
the plurality of grooves in the base being filled with a plastic material to form optical waveguides from the optical ports of the array to the first outer edge of the base; and
a plurality of optical fibers each having a first end, molded into a package with a side formed to removably mate with the first outer edge of the base, and the package further including alignment guides designed to mate with the alignment guides associated with the grooves at the first outer edge so as to axially align the plurality of optical fibers, one each, with the plurality of grooves in the base.

* * * * *